(12) United States Patent
Brewster, Sr.

(10) Patent No.: US 12,459,428 B2
(45) Date of Patent: Nov. 4, 2025

(54) WIRELESS REMOTE CONTROL U-TURN SIGNAL SYSTEM

(71) Applicant: Benjamin Brewster, Sr., Palmdale, CA (US)

(72) Inventor: Benjamin Brewster, Sr., Palmdale, CA (US)

( * ) Notice: Subject to any disclaimer, the term of this patent is extended or adjusted under 35 U.S.C. 154(b) by 17 days.

(21) Appl. No.: 15/961,040

(22) Filed: Jun. 1, 2018

(65) Prior Publication Data

US 2024/0123900 A1  Apr. 18, 2024

(51) Int. Cl.
*B60Q 1/50* (2006.01)

(52) U.S. Cl.
CPC .......... *B60Q 1/547* (2022.05); *B60Q 2900/30* (2013.01)

(58) Field of Classification Search
CPC . B60Q 1/381; B60Q 1/34; B60Q 1/50; B60Q 2900/40; F21W 2103/20
See application file for complete search history.

(56) References Cited

U.S. PATENT DOCUMENTS

| | | | | |
|---|---|---|---|---|
| 6,958,687 | B1* | 10/2005 | Smith | B60Q 1/34 340/472 |
| 10,807,520 | B1* | 10/2020 | Berry | B60Q 1/38 |
| 2005/0179533 | A1* | 8/2005 | Stevenson | B60Q 1/34 340/475 |
| 2007/0069881 | A1* | 3/2007 | Dohan | B60Q 1/34 340/465 |
| 2007/0132573 | A1* | 6/2007 | Quach | B60Q 1/381 340/475 |
| 2016/0207449 | A1* | 7/2016 | Noble | B60Q 1/34 |
| 2016/0229336 | A1* | 8/2016 | Ali | B60Q 1/34 |
| 2020/0238898 | A1* | 7/2020 | James | B60Q 1/343 |
| 2022/0134945 | A1* | 5/2022 | Hoffman | B60Q 1/2607 340/907 |
| 2022/0250537 | A1* | 8/2022 | Balogun | B60Q 1/38 |

* cited by examiner

*Primary Examiner* — Mirza F Alam

(57) ABSTRACT

My Wireless Remote-Control U-turn Signal System attaches to all motor vehicles without using tools or alterations to the vehicle's exterior or interior, and without alterations to the Headlights or Taillights. Comprising: 1 Wireless Signal-pod and 4 Wireless U-turn Signals. The Wireless Signal-pod is programed to activate all 4 U-turn Signals to blink in a U Formation simultaneously. The LED Panels inside the U-turn Signals for the Front and Back Windows are the first claimed to have 18 LED Array Lights blinking 2-Lights per blink in a U Formation. The LED Panels inside the U-turn Signals for the Right and Left Front Fender are the first claimed to have 9 LED Array Lights blinking 1-Light per blink in a U formation simultaneously with the U-turn Signals for the Front and Back Windows.

2 Claims, 9 Drawing Sheets

WIRELESS REMOTE CONTROL U-TURN SIGNAL SYSTEM

CROSS REFERENCE TO RELATED APPLICATIONS 1. 20140091920—U-turn Signaling System and Method.
2. 20070132573—U-turn Signal Device for Motor Vehicles.
3. 20050237174—Two-Step Control Signal Device with a U-turn Signal.
4. 20050179533—Automobile U-turn Signal.
5. 20050168347—U-turn Indicator.

BACKGROUND OF INVENTION

Field of the Invention

My Wireless Remote-Control U-turn Signal System relates to the right and left turn signals on all automobiles, trucks, motorcycles and buses.

Description of the Previous Art

I conducted a patent search according to the USPTO, I found 5 results on Apr. 17, 2018.

Referring to patent application publication/Apr. 3, 2014/sheet 2 through 5/US 2014/0091920 A1: After reviewing FIG. 2A, I notice the design causes alterations to an already patented headlights.

Referring to patent application publication/Jun. 14, 2007/sheet 1 through 5/US 2007/0132573 A1: After reviewing FIG. 1, it seems extremely hard to figure out how to install unless alterations are permitted by other patent holders and FIGS. 7 and 8 reveals the fact that the manufactures must change their wiring diagram and many other things when attempting to install the U-turn signal device for motor vehicles belonging to patent application publication 20070132573.

Referring to patent application publication/Oct. 27, 2005/Sheet 1 through 6/US 2005/0237174 A1: After reviewing FIG. 1, it looks like a taillight lens protector and FIG. 4 reminds me of a stylish trim that fit around license plates and it do not look like a U-turn signal when looking at the Two-step control signal device with a U-turn signal belonging to patent application publication 2005/0237174.

Referring to patent application publication/Aug. 18, 2005/Sheet 1 through 4/US 2005/0179533 A1: After reviewing drawings on sheets 2 of 4, it reminds me of an Inverted designed on the lens cover of what seems to be a headlight, and sheets 3 of 4 suggest the changing of the right and left turn signal switch and wiring harness when looking at the uncomplete apparatus belonging to patent application publication 2005/0179533.

Referring to patent application publication/Aug. 4, 2005/sheet 1 through 3/US 20050168347 A1: After reviewing FIG. 1, it reminds me of an unrealistic approach to designing a U-turn signal. FIG. 5 through 9 reminds me of a road construction sign used by Caltrans workers and not a U-turn signal when looking at the uncomplete apparatus belonging to patent application publication 20050168347.

BRIEF SUMMARY OF THE INVENTION

My wireless remote control U-turn signal system relates to the right and left turn signals on motor vehicles.

My wireless remote control U-turn signal system will be made of durable plastics; rubber seals; gaskets; and lens covers sealed with screws.

My wireless remote control U-turn signal system is comprised of one wireless signal-pod and four wireless remote control U-turn signals.

My wireless remote control U-turn signal system works like the right and left turn signals, when activated, it will illuminate the intersections for the purpose of alerting surrounding motorists and pedestrians of the motorist's intended direction while making a U-turn.

My wireless remote control U-turn signal system will attach to motor vehicles where surrounding motorists and pedestrians will have a clear view of the U-turn signals from all directions.

My wireless remote control U-turn signal system will power-up by heavy-duty lithium batteries, and it works like wireless lighting systems such as on bicycles.

My wireless remote control U-turn signal system will help in preventing U-turn accidents that happen each year at intersections.

BRIEF DESCRIPTION OF THE SEVERAL VIEWS OF THE DRAWING

FIG. 3 180-degrees rotation from a U position: Inverted front top up view, showing how a completely assembled wireless remote control U-turn signal looks like before attaching to the inside upper-center back window of old and new motor vehicles shown in FIG. 3. The motorist behind the motorist in the left-hand lane making a U-turn, the U-turn signal for the back window will look like an Inverted U shape blinking 2-lights per-blink from right to left.

FIG. 6 90-degrees rotation to the left from a U position: Front top view, showing how a completely assembled wireless remote control U-turn signal looks like before attaching to the front left fenders of old and new motor vehicles blinking 1-light per-blink from top-right to the bottom-left.

FIG. 7 90-degrees rotation to the right from a U position: Front top view, showing how a completely assembled wireless remote control U-turn signal looks before attaching to the front right fender of old and new motor vehicles blinking 1-light per blink from bottom-right to the top-left.

FIG. 9 Prospective: Above back view of the Wireless Signal-pod

DETAILED DESCRIPTION OF THE INVENTION

Figure 1:
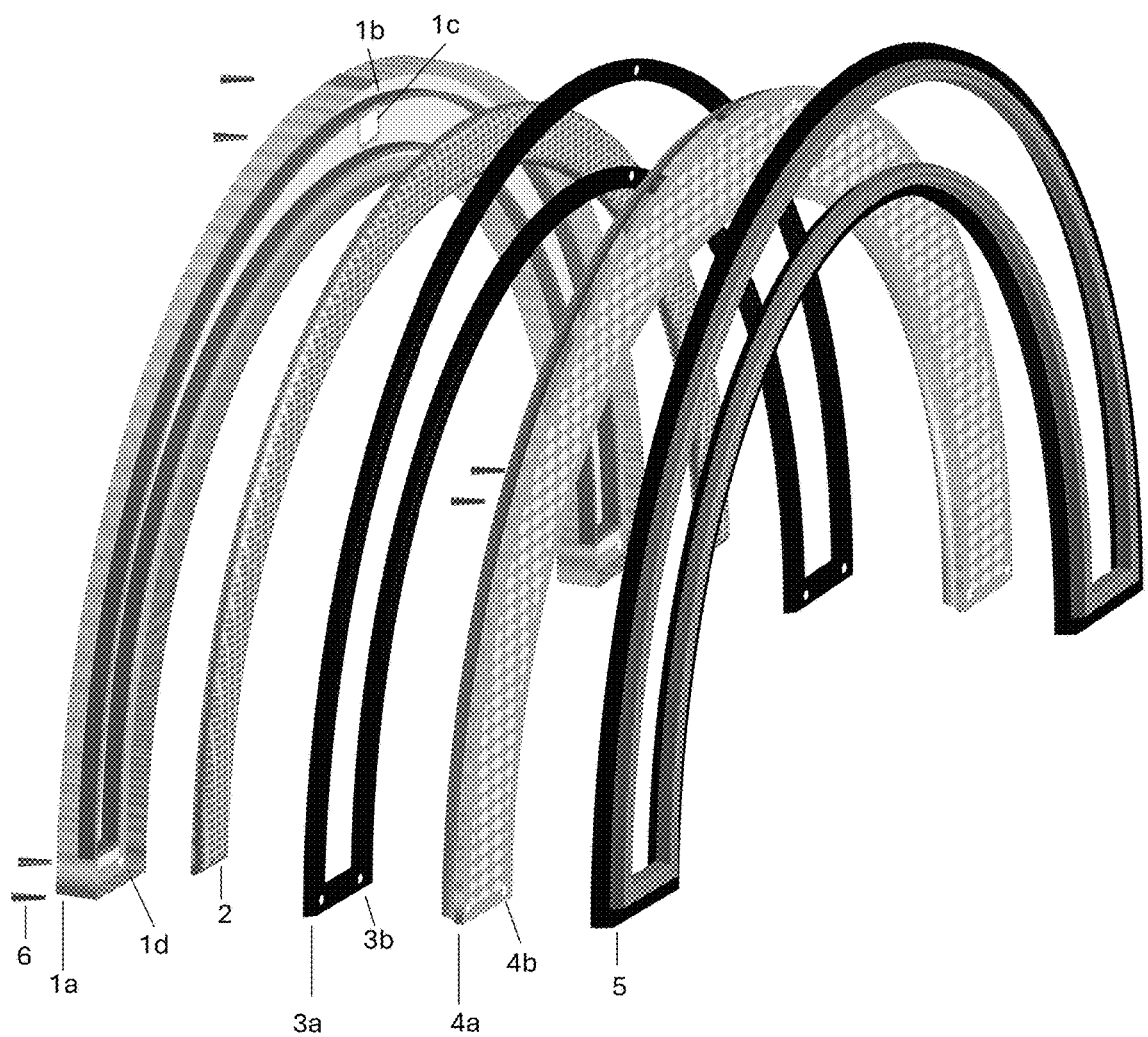
FIG. 1 Parallel Off Axis 2: Top view of the wireless remote control U-turn signal diagram for the front and back windows comprising: a U shape housing; a U shape LED panel with 18 LED array lights programmed to blink in a U formation; a U shape gasket that holds the LED panel in-place; a U shape lens cover that sit on top of the gasket that holds the LED panel in-place; and a U shape rubber seal that fits around the U-turn signals lens cover.

My Wireless Remote Control U-turn Signal shown in FIG. 1 reference the numbers: (1a), U shape plastic housing; (1b), a U shape rubber seal affixed inside the housing; (1c), the opening that reveals the sensor chip affixed to the back of the LED panel; (1d), six screw holes; (2), U shape LED panel with 18 LED array lights programmed to blink 2 lights per blink in a U formation will sit on the rubber seal affixed inside the housing; (3), a U shape rubber gasket that holds in-place the LED panel before attaching the lens cover: (4), a U shape lens cover: (5), a U shape rubber seal that attaches to the outer lens cover which attaches to the inside front and back windows of motor vehicles; and (6), showing the six screws needed for the manufacturer to attach numbers 1-5.

Figure 5:
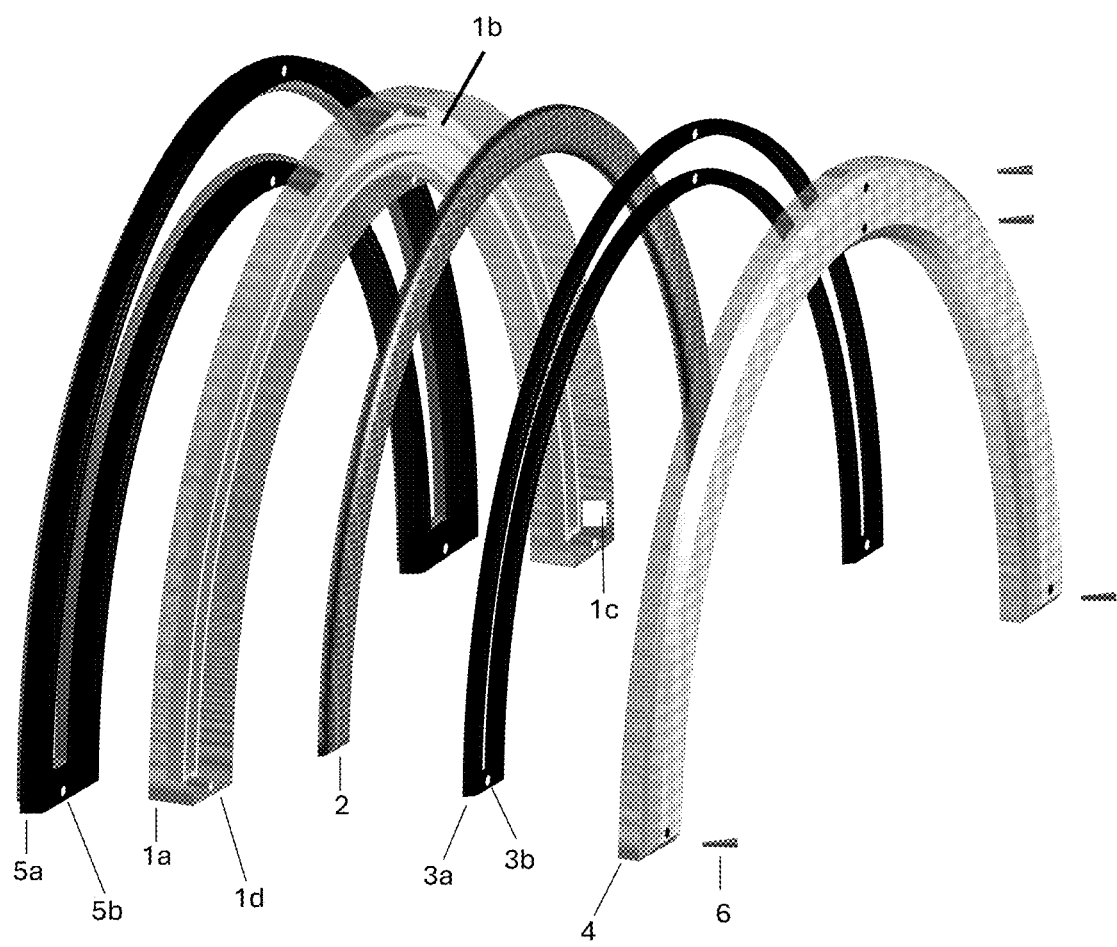
FIG. 5 Parallel Off Axis 2: Right top view of the wireless remote control U-turn signals for the front right and left fenders comprising: a U Shape housing; a U shape LED panel with 9 LED array lights programmed to blink in a U formation; a U shape gasket that holds the LED panel in-place; a U shape lens cover that sit on top of the gasket that holds the LED panel in-place; and a U shape rubber seal that fits around the U-turn signals housing before attaching to the motor vehicle's front fenders.

My wireless remote control U-turn signal system shown in FIG. 5 reference the numbers (1a), a U shape plastic housing; (1b), a U shape rubber seal affixed inside the housing; (1c), the opening that reveals the sensor chip attached to the LED Panel; (1d), four screw holes; (2), a U shape LED panel with 9 LED lights programmed to blink 1 light per blink in a U formation will sit on the rubber seal affixed inside the housing; (3), a U shape rubber gasket that holds in-place the LED panel before attaching to the lens cover; (4), a U shape lens cover; (5), a rubber seal that attaches to the housing before attaching to the front fenders; and (6), showing the four screws needed for the manufacturer to attach numbers 1-5.

Figure 2:
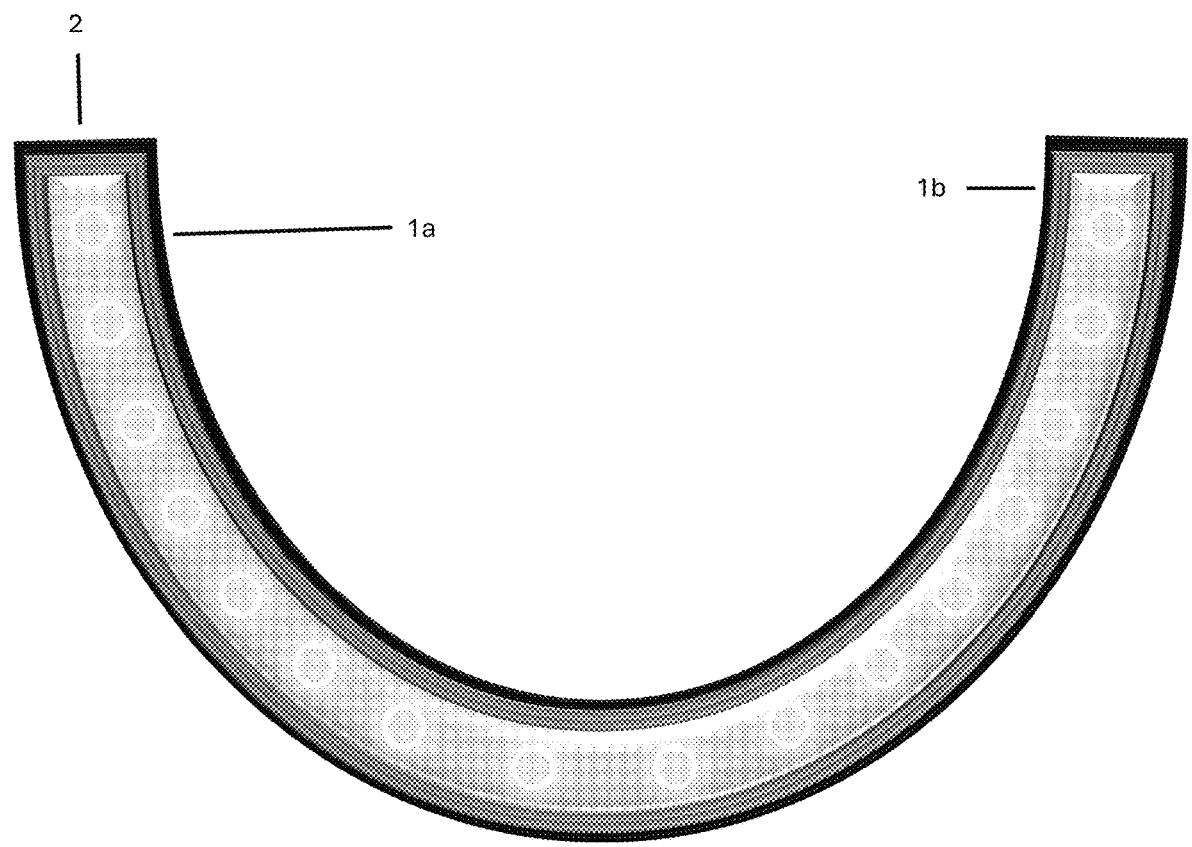
FIG. 2 No rotation from a U position: Front top up view, showing how a completely assembled wireless remote control U-turn signal looks like before attaching to the inside upper-center front window of old and new motor vehicles shown in FIG. 2. To the oncoming motorist approaching the intersection, the U-turn signal for the front window will look like a U shape blinking 2-lights per-blink from left to right.
Figure 9:
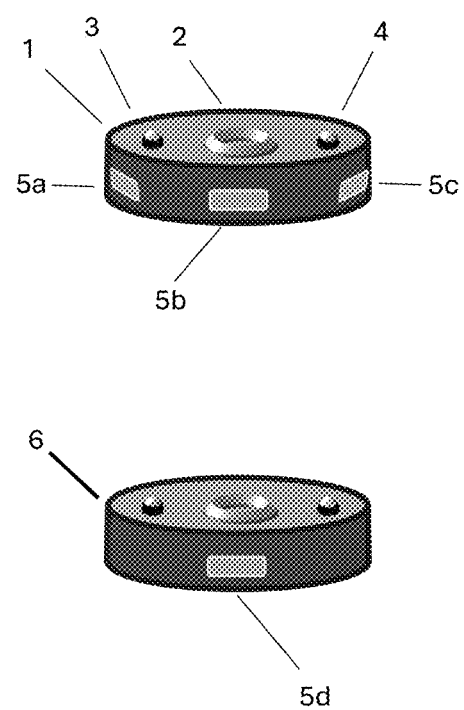
FIG. 9 Prospective: Above front view of the Wireless Signal-pod

U-turns My wireless remote control signal system is comprised of (1) wireless signal-pod shown in FIGS. 9 and (4) U-turn signals shown in FIGS. 2; 3; 6; and 7.

My Wireless Signal-pod shown in FIG. 9, reference the numbers (1) a front view of the wireless signal-pod, the side facing the wireless U-turn signal for the front window; (2) activation button programmed to make all four U-turn signals to blink in a U-formation simultaneously and to deactivate all 4 U-turn signals simultaneously; (3) a red LED light indicating the lithium battery need to be replaced; (4) a green LED light indicates the lithium battery is good; (5a) sensor that activates the U-turn signal attached to front right fender; (5b) sensor that activates the U-turn signal attached to front inside window; and (5c) sensor that activates the U-turn signal attached to front left fender. (6) Prospective: Above back view of the wireless signal-pod showing (5d) sensor that activates the U-turn signal attached to back Inside window.

My 4 wireless remote control U-turn signals will be programmed to blink in a U-formation simultaneously when activated by the wireless signal-pod.

My wireless remote control U-turn signal for the front windows will look like a U shape to oncoming motorist, with 18 LED bright array lights programmed to blink 2-lights per blink in a U formation from top upper left end to the top upper right end shown in FIG. 2.

Figure 3:
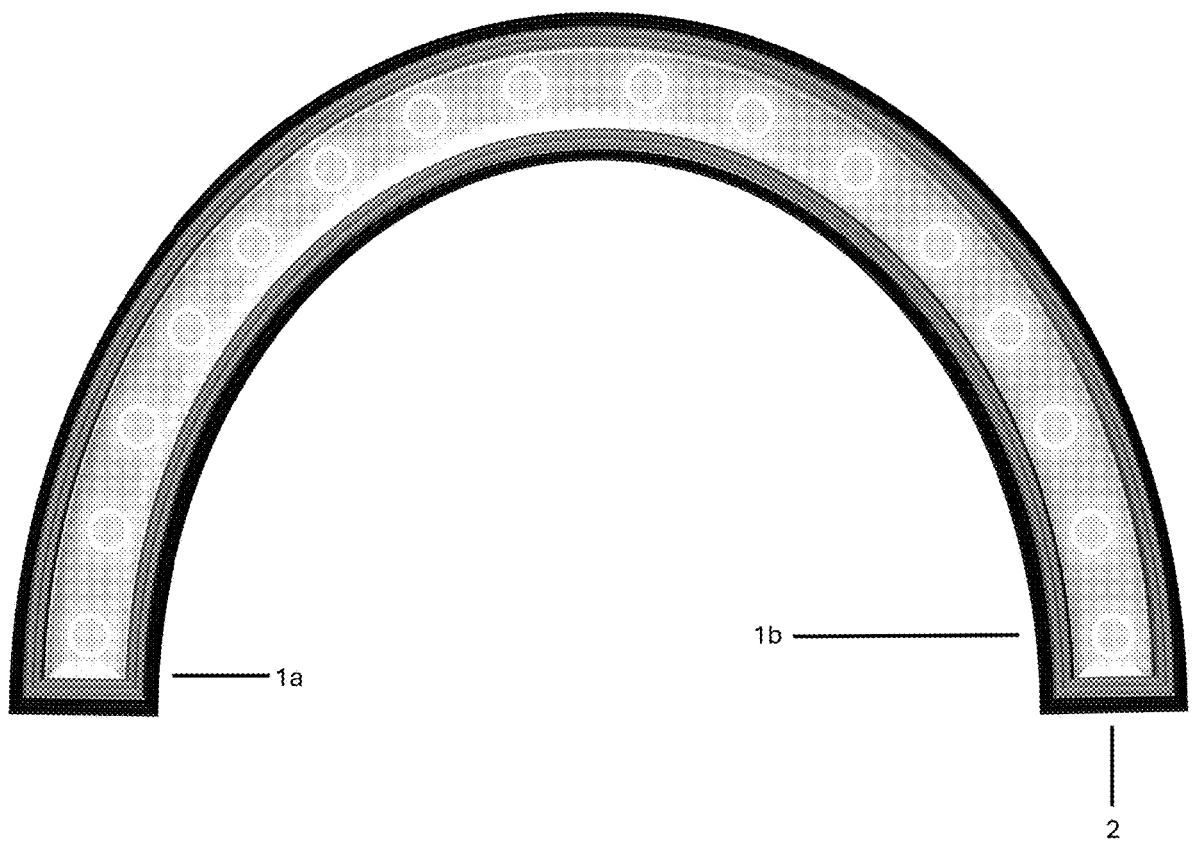
Figure 4:
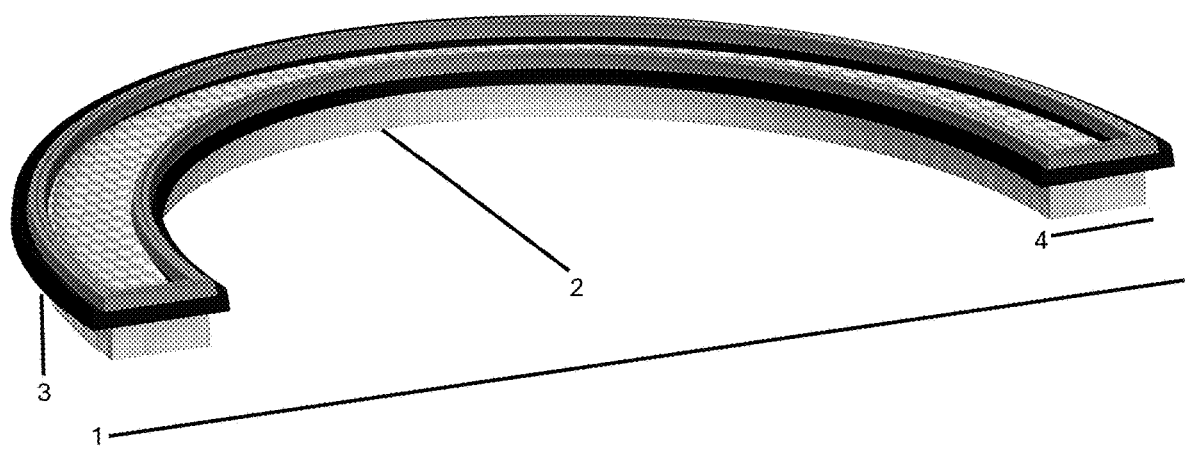
FIG. 4 Parallel Off Axis 1: Top view of a completely assembled wireless remote control U-turn signals for the front and back windows of old or new motor vehicles shown in FIG. 4 referencing to the following numbers; (1) reveal the length of 8 inches; (2) reveal the height of 5 inches: (3) reveal the width or depth of ¾ Inch; and (4) reveal the length of 1 inch.

My wireless remote control U-turn signal for the back windows will look like an Inverted U-turn Signal to motorists following behind you, with 18 LED bright array lights programmed to blink 2-Lights per blink in a U formation from bottom right end to the bottom left end shown in FIG. 3.

Figure 6:
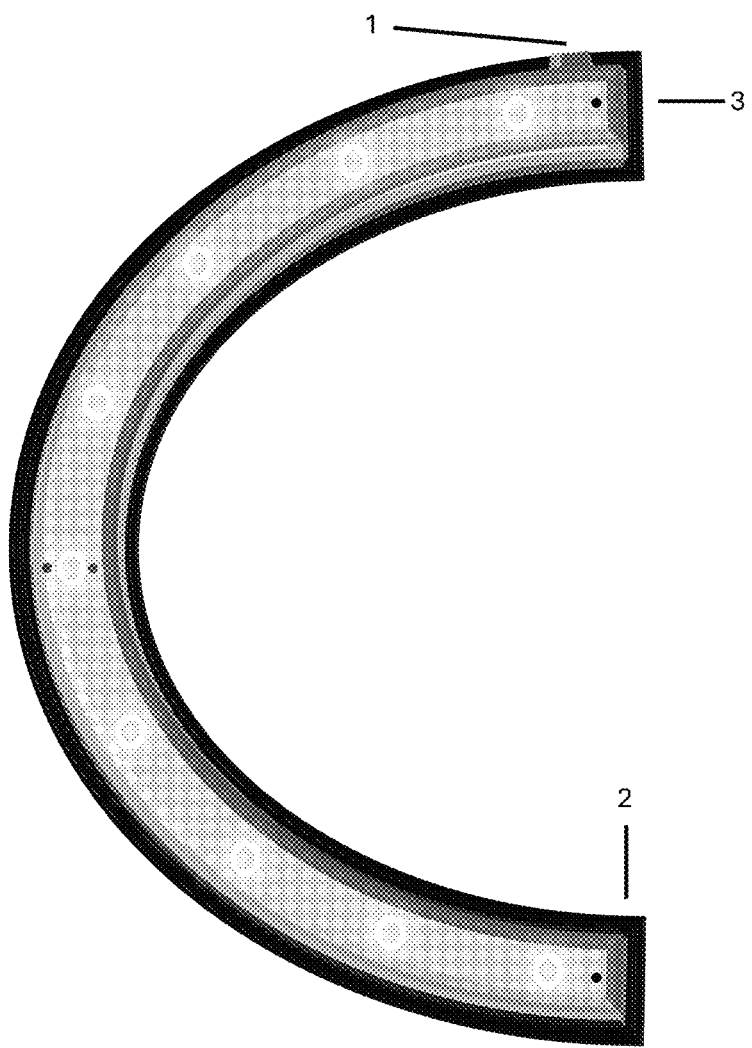

My wireless remote control U-turn signal for the front left fenders will look like a U rotated 90-degrees to the left, with 9 LED bright array lights blinking 1-light per blink in U formation from the top right end to the bottom left end shown in FIG. 6.

Figure 7:
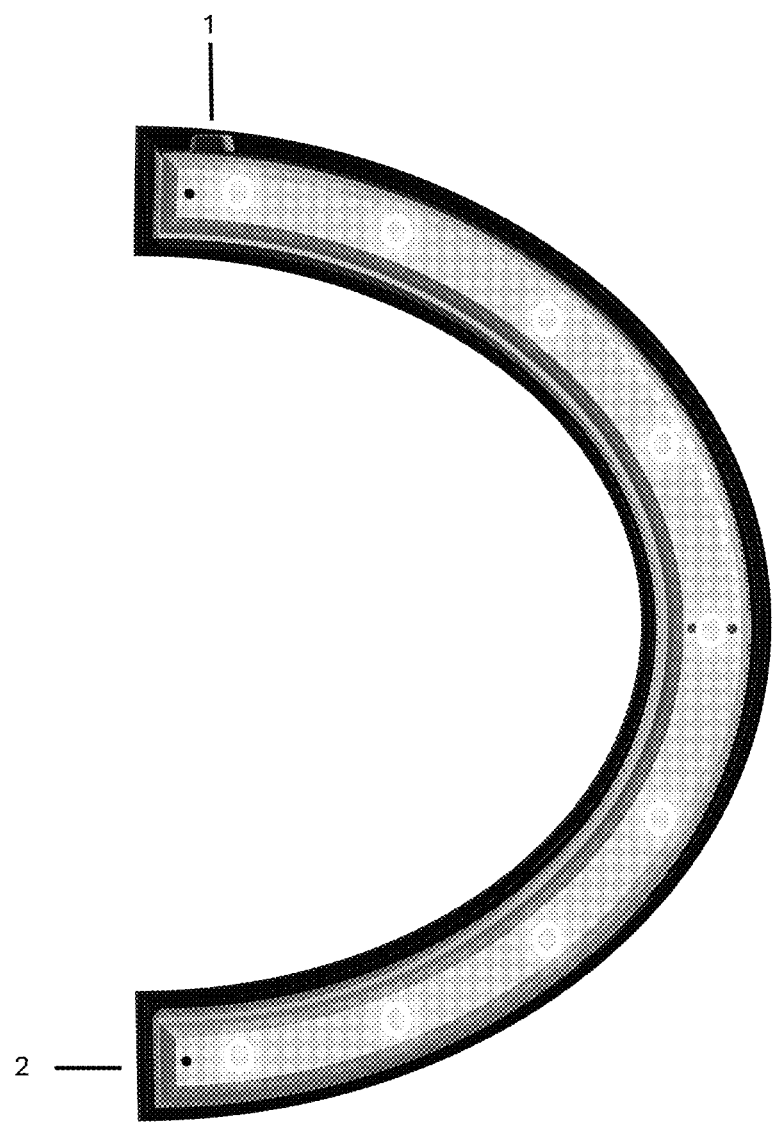
Figure 8:
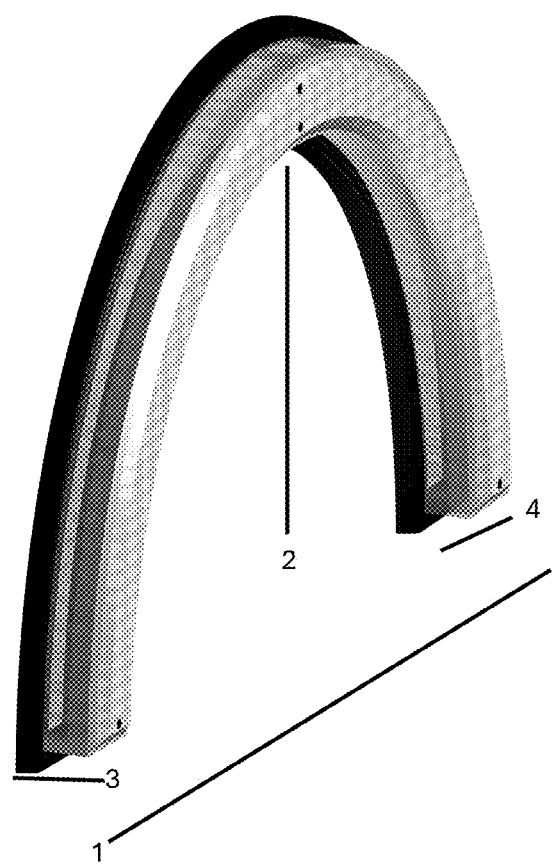
FIG. 8 Parallel Off Axis 2: Right angle view of a completely assembled wireless remote control U-turn signals for the front right and left fenders shown in FIG. 8 referencing the following numbers: (1) reveal the length of 5 inches: (2) reveal the height of 4 inches: (3) reveal the width of 1 inch; and (4) reveal the length of 1 inch.

My wireless remote control U-turn signal for the front right fenders will look like a U rotated 90-degrees to the right to motorist to right, with 9 LED bright array lights blinking 1-light per blink in U formation from the bottom right end to the top left end shown in FIG. 7.

I claim:

1. A wireless remote-control U-turn signal system encompasses components that make the wireless remote control U-turn signals, shape like an actual U shape, comprising:

one U shape wireless remote control U-turn signal for front windows of old or new motor vehicles containing a U shape housing with a U shape LED panel with 18 LED array lights programmed to blink two lights per blink in a U formation from top-left-end to top-right-end with a U shape gasket that holds the LED panel in-place before placing a U shape lens cover that sit on top of the gasket that holds the LED panel in-place and a U shape rubber-seal that fits around the U-turn signal lens cover before attaching to front inside windows without using tools or alterations to the vehicle's interior;

one U shape wireless remote control U-turn signal for back windows of old or new motor vehicles containing a U shape Housing with a U shape LED panel, with 18 LED array lights programmed to blink two lights per blink in a U formation from bottom-right-end to bottom-left-end with a U shape gasket that holds the LED panel in-place before placing the U shape lens cover that sit on top of the gasket that holds the LED panel in-place and a U shape rubber-seal that fits around the U-turn signal lens cover before attaching to the back windows without using tools or alterations to the vehicle's interior;

one U shape wireless remote control U-turn signal for front left fenders of old or new motor vehicles containing a U shape housing with a U shape LED panel inside the U-turn signal, with 9 LED array lights programmed to blink one light per blink in a U formation from the top-right-end to the bottom-left-end with a U shape gasket that holds the LED panel in-place before placing a U shape lens cover that sit on top of the gasket that holds the LED panel in-place and a U shape rubber-seal that fits around the U-turn signal housing before attaching to the front left fenders without using tools or alterations to the vehicle's exterior;

one U shape wireless remote control U-turn signal for front right fenders of old or new motor vehicles containing a U shape Housing with a U shape LED panel inside the U-turn signal, with 9 LED array lights programmed to blink one light per blink in a U formation from the bottom-right-end to the top-left-end with a U shape gasket that holds the LED panel in-place before placing a U shape lens cover that sit on top of the gasket that holds the LED panel in-place and a U shape rubber-seal that fits around the U-turn signal housing before attaching to the front right fenders without using tools or alterations to the vehicle's exterior; and one wireless signal-pod programmed to activate all four U-turn signals to blink in a U formation simultaneously without connecting to a power source of a motor vehicle's electrical system and the wireless signal-pod attach to steering wheel or dashboard or within range of driver while driving the motor vehicle without using tools or alterations to the vehicle's interior while being attach.

2. The wireless remote-control U-turn signal system of claim 1, attach to the old or new motor vehicles without amendments to current design of the wireless remote control U-turn signal system, and attachment locations will not obstruct the drivers' view while driving the vehicle.

\* \* \* \* \*